United States Patent [19]

Pippin

[11] Patent Number: 5,141,128
[45] Date of Patent: Aug. 25, 1992

[54] RECONFIGURABLE VERTICAL CONVEYOR DISPENSER

[75] Inventor: James M. Pippin, Keller, Tex.

[73] Assignee: ElectroCom Automation, Inc., Arlington, Tex.

[21] Appl. No.: 714,601

[22] Filed: Jun. 13, 1991

[51] Int. Cl.⁵ .............................................. G07F 11/00
[52] U.S. Cl. .................................... 221/84; 221/253; 198/817; 198/801
[58] Field of Search .................. 221/76, 77, 82, 84, 221/85, 218, 253; 198/817, 801

[56] References Cited

U.S. PATENT DOCUMENTS

| | | | |
|---|---|---|---|
| 3,021,030 | 2/1962 | Thompson | 221/77 |
| 3,168,951 | 2/1965 | Gold et al. | 198/801 |
| 3,893,588 | 7/1975 | Patrick | 221/85 |
| 3,938,699 | 2/1976 | Wittern et al. | 221/85 |
| 4,199,051 | 9/1980 | Kimberley | 198/801 |
| 4,778,044 | 10/1988 | Kondo | 198/817 |

FOREIGN PATENT DOCUMENTS

| | | | |
|---|---|---|---|
| 667497 | 9/1964 | Italy | 221/84 |
| 0080298 | 7/1978 | Japan | 221/77 |
| 442407 | 2/1936 | United Kingdom | 221/84 |

*Primary Examiner*—H. Grant Skaggs
*Attorney, Agent, or Firm*—Harold E. Meier

[57] ABSTRACT

In accordance with this invention there is provided a reconfigurable compartmentized vertical conveyor dispenser for dispensing products in an automated order dispensing system. The size of compartments for holding the products is chosen by adjusting the spacing of shelves forming the compartments. The width of the compartments is varied by coupling adjacent compartmentized vertical conveyor dispenser for synchronous operation.

15 Claims, 4 Drawing Sheets

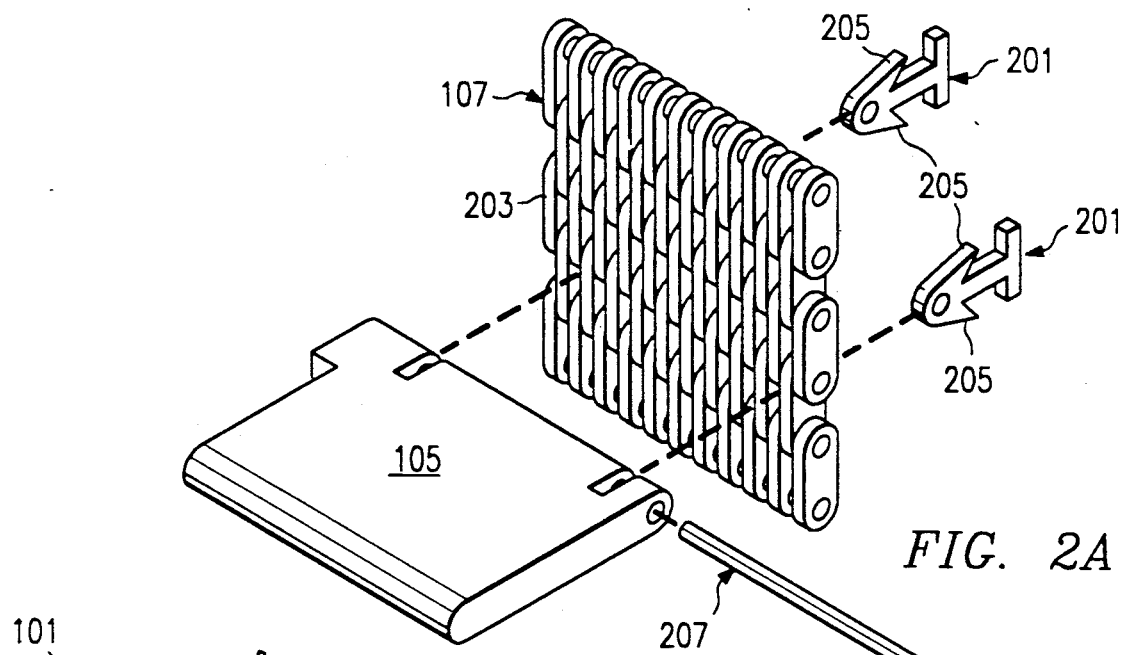
FIG. 2A
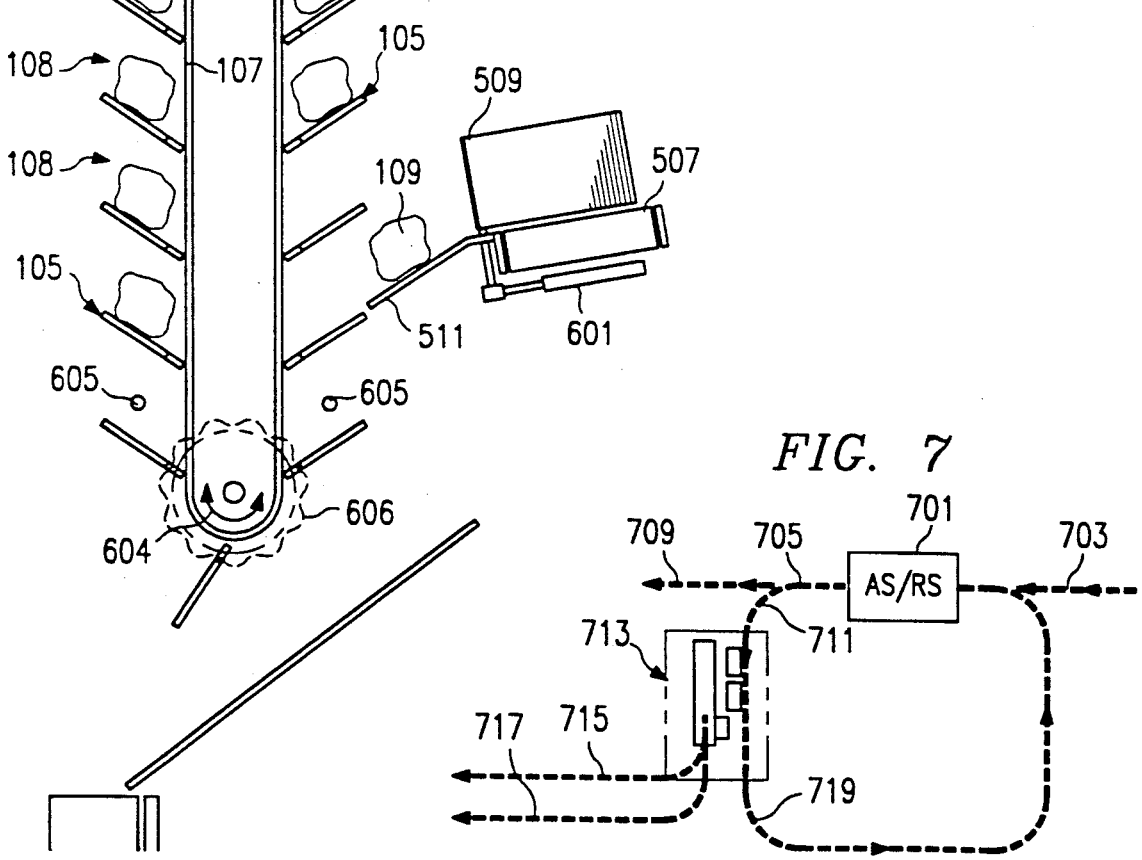
FIG. 6
FIG. 7

RECONFIGURABLE VERTICAL CONVEYOR DISPENSER

TECHNICAL FIELD

The invention relates to the dispensing of products in automatic order dispensing systems and more particularly to a vertical conveyor dispenser for use in an automatic order dispensing system.

BACKGROUND OF THE INVENTION

Distribution centers are required at times to supply less than caseload quantities of a large variety of products to a number of different customers. The process of assembling orders of less than caseload quantities of products is generally referred to as "broken case order picking". To reduce cost and errors associated with broken case order picking automated order dispensing systems (AOS) are installed in the distribution centers.

A typical AOS is comprised of a central conveyor and a plurality of product dispensers contiguous to the central conveyor. Each product dispenser is loaded with a particular product. A central controller causes the necessary dispensers to place on the central conveyor the correct quantity of particular products required to fill an order. At the end of the conveyor, the products are packaged for delivery to the customer.

The primary task of a product dispenser is the controlled dispensing of products onto the central conveyor. The product dispenser must, therefore, "singulate" products so that each may be counted out of the dispenser onto the central conveyor in the correct quantities. Most dispensers are designed for, or dedicated to, dispensing particular products. On the other hand, a vertical or compartmentized conveyor dispenser, sometimes also called a carousel dispenser, has compartments for holding a product to be dispensed from the vertical conveyor. It is not dedicated to any particular product and is ideal for singulating and dispensing products that are bulky or oddly shaped. Products are manually or automatically loaded into the compartments of the vertical conveyor. Operation of the vertical conveyor causes the compartment nearest the bottom of the conveyor to spill its contents onto the central conveyor.

In prior art vertical conveyor dispensers, the size of the compartments are fixed. If the size of the compartments is small, the selection of products that can be dispensed is very limited. If the size of the compartments are made large enough to accommodate a wide range of sizes and shapes of products, the number of products a dispenser holds is limited, thus requiring more dispensers on the central conveyor, and further requires loading more often since there are fewer compartments on the vertical conveyor.

SUMMARY OF THE INVENTION

The present invention relates to a compartmentized vertical conveyor dispenser that is easily reconfigurable to hold and dispense products of a wide variety of sizes and types. The vertical size of a compartment holding a product is adapted with shelves that are easily removed and reassembled. The width of the product compartment is also adjustable by joining adjacent vertical conveyors by means of a coupling mechanism for synchronous operation of the conveyors. An optional automatic replenishment system continually replenishes the vertical conveyors with products for dispensing.

BRIEF DESCRIPTION OF THE DRAWINGS

FIG. 2 and FIG. 2A are cutaway illustrations of a vertical conveyor chain with a snap-in shelf pivot and an attached shelf.

FIG. 6 is a end view of compartmentized vertical conveyor dispenser, and a cross-sectional view of a product central conveyor and an automatic replenishment system.

FIG. 7 is a schematic diagram of product streams in an automatic order dispensing system.

DETAILED DESCRIPTION OF THE DRAWINGS

Figure 1:
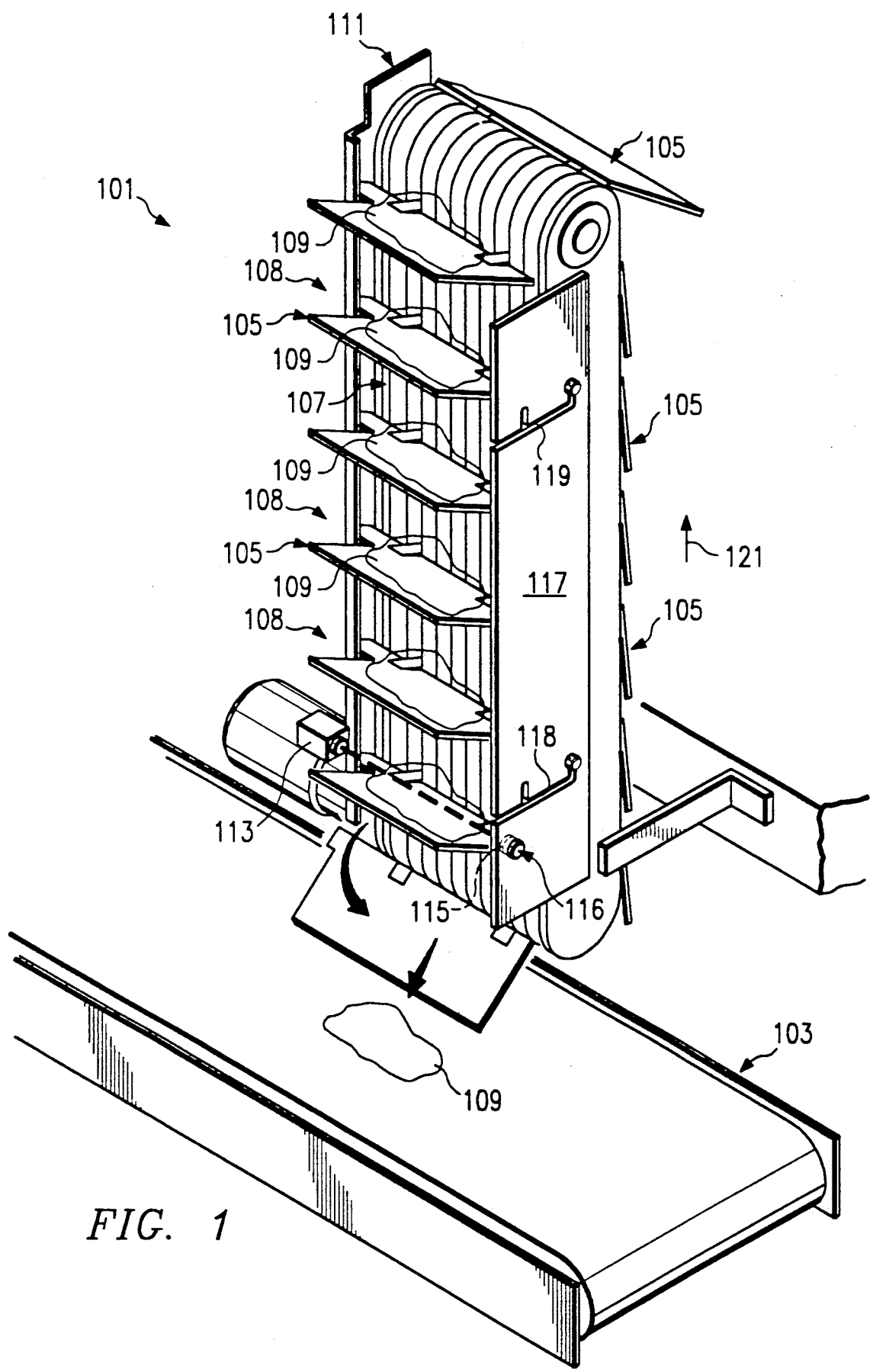
FIG. 1 is a perspective view of one embodiment of a vertical conveyor dispenser in accordance with the present invention.

Referring to FIG. 1, a vertical conveyor dispenser 101 is mounted for operation with a central conveyor 103 of an automated order dispensing system. The vertical conveyor dispenser 101 is compartmentized by utilizing a plurality of shelves 105 coupled to a continuous conveyor belt 107. As illustrated, the shelves 105 are substantially equally spaced along the conveyor belt and are pivotally mounted thereto. Compartments 108 into which products 109 are placed are formed by supporting the shelves slightly angled above the horizontal on the front side of the conveyor belt 107 by means of a pivot bracket 111. Other suitable means for supporting the shelves include braces mounted to the underside of the shelf and extending from the shelf to engage the vertical conveyor belt 107. In the embodiment shown in FIG. 1, as a product is dispensed from a compartment 108, the shelf forming the compartment begins to move up the back side of the conveyor belt 107 and folds into a retracted position.

On the side of the vertical product dispenser 101 opposite of the pivot bracket 111, a retractable or removable partition 117 separates the product compartments 108 from those of adjacent vertical conveyor dispensers (not shown in FIG. 1). The partition 117 is mounted on the vertical conveyor dispenser with pin and slot connections 119 to permit retracting and extending the partition. When, as described in connection with FIG. 3, two adjacent vertical product dispensers 101 are coupled for synchronous operation, the partition 117 is retracted by sliding the partition toward the back side of the vertical conveyor dispenser.

Figure 3:
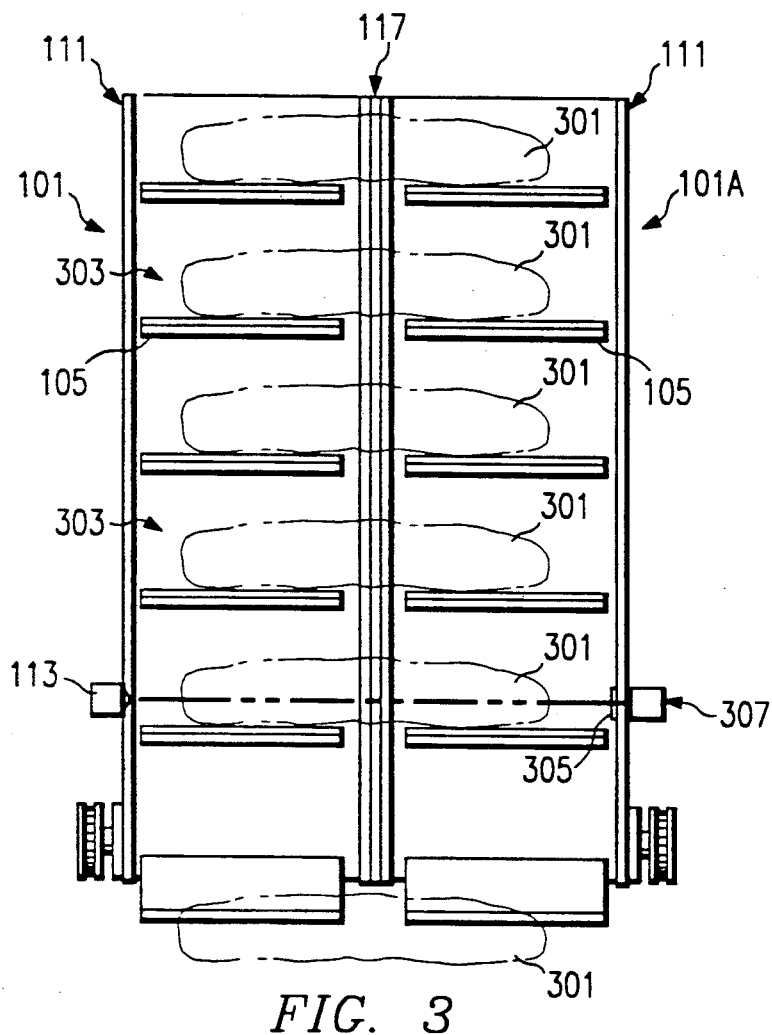
FIG. 3 is a side view of adjacent vertical conveyor dispensers coupled for synchronous operation.

A product is dispensed from the vertical conveyor dispenser by moving the product compartments formed by shelves 105 downwardly until the bottom shelf is no longer horizontally extended and deposits the product onto the central conveyor 103. In an automated order dispensing system, a central controller operates the vertical conveyor dispenser 101. A retroreflective photoelectric cell 113, the output of which is coupled to the central controller, acting in combination with reflective surface 115 on the retractable partition 117 detects the presence of a product in each product compartment as it reaches the bottom of the vertical conveyor dispenser 101. Reflective surface 116 acts in combination with a second photoelectric cell 307 shown in FIG. 3 for sensing the presence of products in an adjacent vertical conveyor dispenser 101A as shown in FIG. 3. To position a product at the bottom of the vertical conveyor dispenser 101 for dispensing, the vertical conveyor belt 107 rotates until the presence of a product is detected by the photoelectric cell 113 and then stops until a dispense signal again activates the conveyor belt.

Figure 2:
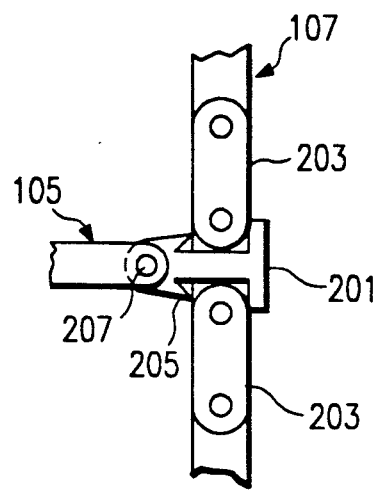

Referring now to FIG. 2 and FIG. 2A, shelves 105 are pivotally coupled to the conveyor belt 107 by means of snap-in shelf pivots 201. Two pivots are required to support each shelf as shown in FIG. 2A. The snap-in shelf pivot 201 is inserted between aperture links 203 of a conveyor chain that forms part of the belt 107 and, is secured by latch ears 205 made from a flexible plastic. Each of the shelves 105 is pivotally coupled to the snap-on shelf pivot 201 by sliding a shelf pin 207 through the shelf pivot as best illustrated in FIG. 2A. The shelves 105 are held in place on the conveyor belt 107 by means of the pivot bracket 111 and the partition 117 mounted to the structural members for the conveyor belt. The positions of shelves 105 on the conveyor belt 107 are easily changed, and consequently the size of the compartments formed by shelves 105 are quickly reconfigurable by removing or adding shelves 105. The partition 117 is moved to its most inward position on slot 119 when adding or removing shelves 105.

Referring now to FIG. 3, to reconfigure the horizontal width of compartments formed by shelves 105, adjacent vertical conveyor dispensers 101 and 101A are coupled for synchronous operation. Shelves 105 on the adjacent conveyors are aligned such that a single oversized product 301 may be supported by two adjacent shelves. The partition 117 between the two vertical conveyor dispensers is retracted to the most inward detent position of slot 119, as shown, to provide for an extended product compartment 303. When the partition 117 is retracted, photoelectric cell 113 works in combination with reflective surface 305 to sense a product 301. When vertical conveyor dispensers are decoupled for separate operation, partition 117 is again extended to the most outward position of the detent position of slot 119.

Figure 4:
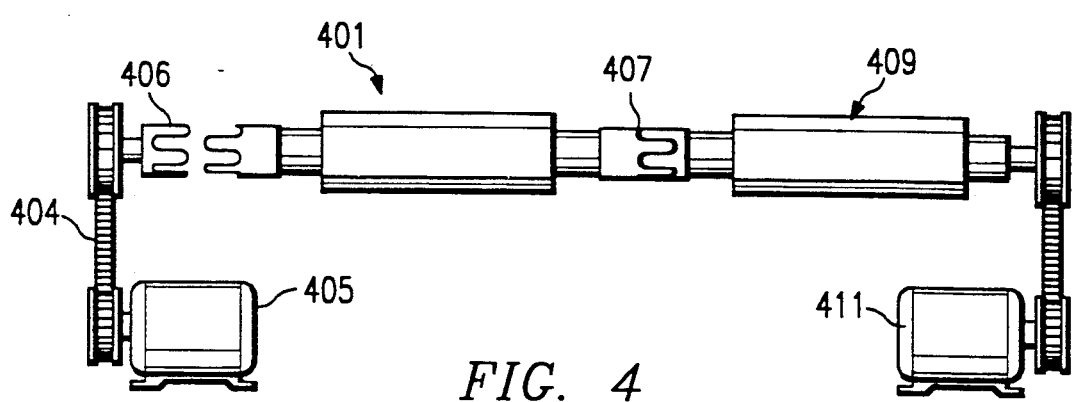
FIG. 4 is an illustration of the drive mechanism for the adjacent vertical conveyor dispenser shown in FIG. 3.

Referring to FIG. 4, there is shown the drive mechanisms for the vertical conveyor dispensers 101 of FIGS. 1 and 3. A drive motor 405 is coupled to a drive sprocket 406 by means of a flexible belt 404. When a vertical conveyor dispenser 101 operates as an individual unit, the drive sprocket 406 engages a drive shaft 401 that engages the conveyor belt 107. Rotating the drive shaft 401 imparts a motion to the belt 107 in the direction of the arrow 121 of FIG. 1.

Also shown in FIG. 4 is a drive motor 411 coupled to a drive shaft 409 for movement of the conveyor belt 107 of the second vertical conveyor dispenser 101 of FIG. 3. When adjacent vertical conveyor dispensers are coupled together to dispense oversized products, as shown in FIG. 3, synchronous operation is achieved by decoupling the drive haft 401 from the drive sprocket 406 and the drive motor 405. Drive shaft 401 is then coupled to the drive shaft 409 by means of a coupler 407 to form a synchronous conveyor drive unit.

Figure 5:
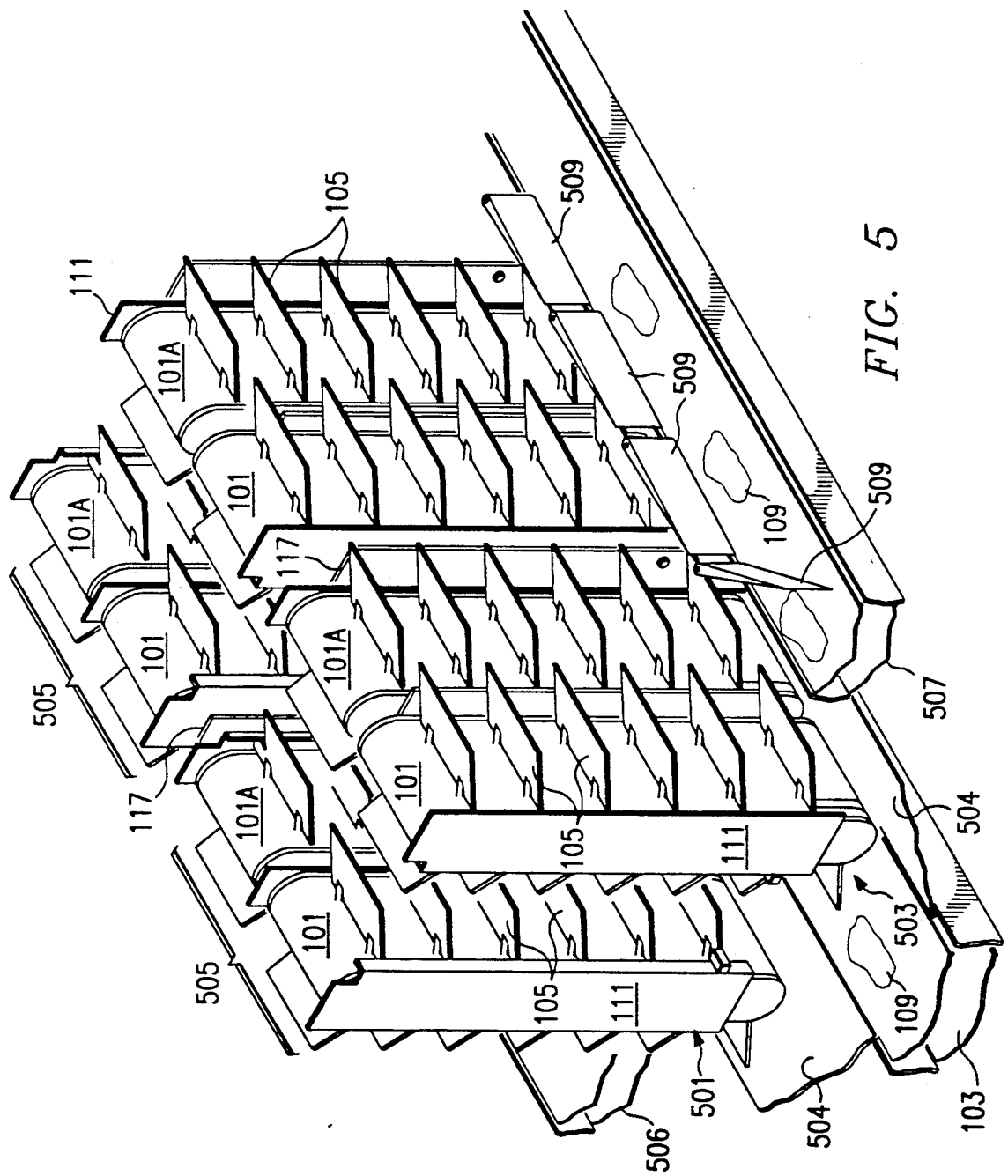
FIG. 5 is a perspective view of an automatic order dispensing system having a plurality of adjacent compartmentized vertical conveyor dispensers and an automatic replenishment system.

Referring now to FIG. 5, a plurality of vertical conveyor dispensers 101 and 101A are shown in one possible configuration of an automated order dispensing system with automatic replenishing of the dispensers with products. Two rows 501 and 503 of vertical conveyor dispensers 101 and 101A are arranged on both sides of a central conveyor 103. Products are dispensed onto slides 504 from the vertical conveyors 501 and 503 The slides divert the products onto the central conveyor 103. The vertical conveyor dispensers 101 and 101A are arrayed in pairs 505 separated by the retractable or removable partition 117. The pairs 505 of dispensers 101 and 101A are coupled for synchronous operation by the mechanism shown in FIG. 4 to handle oversized products. The partition 117 also partitions slides 504.

An automatic replenishment system replenishes each vertical conveyor dispenser with products for dispensing. Product transport conveyors 506 and 507, one for each row 501 and 503, respectively, of vertical conveyor dispensers 101 and 101A, provide a singulated stream of products to the vertical conveyor dispensers. Spaced along one side of each product transport conveyor 506 and 507, one for each vertical dispenser conveyor 101 and 101A, are diverting flaps 509. Each flap 509 is mounted for rotation about a fixed axis perpendicular to the surface of the product transport conveyor 506 or 507 (only shown for conveyor 507). To replenish a vertical conveyor dispenser 101 or 101A, a flap 509 associated with the vertical conveyor dispenser to be replenished is rotated over the product transport conveyor and diverts a product from the singulated product stream into a shelf 105. The product transport conveyors 506 and 507 are tilted toward the vertical conveyor dispenser 101 and 101A to facilitate the diversion of the product into the shelves 105. When a flap 509 is not diverting a product, it is retracted to a position parallel to the product transport conveyor to allow free movement of products past the flap. In the retracted position, the flaps form a rail that prevents products from sliding off the tilted product transport conveyor until a flap is extended.

Now referring to FIG. 6, a cross-sectional view of a vertical conveyor dispenser 101 with the automated replenishment system is shown. Product transport conveyor 507 is shown to be tilted toward the vertical conveyor dispenser 101 to facilitate loading of products 109 into compartments 108. Actuating air cylinder 601 rotates flap 509.

Compartments 108 of a vertical conveyor dispenser 101 are filled one at a time with a product diverted by a flap 509 associated with the vertical conveyor dispenser from a singulated stream of products (not shown) on the product transport conveyor 507. The conveyor belt 107 is advanced in the direction indicated by arrow 603 for filling. This direction is opposite of that, as indicated by arrow 604, for dispensing products. A geneva mechanism 606 brings the shelves 105 to an upright position against gravity. The geneva mechanism 606 moves the shelves 105 in the direction indicated by arrow 604. Replenishing in direction indicated by arrow 603 insures that an empty compartment 108 is presented for filling. The above-described process is repeated until photoelectric cell 605 senses the presence of a product in a compartment 108, at which time the vertical conveyor dispenser 101 is fully replenished.

Now referring to FIG. 7, a schematic representation of a an automatic replenishment system, cases of products to be dispensed are moved from a receiving bay or other storage area (not shown) in a building in which an automatic order dispensing system (AOS) is located, to an automatic storage and retrieval system ("AS/RS")

701 for storing and retrieving case lot quantities of products along path 703. A conveyor or any other type of suitable transport mechanism is used to move the products along path 703. The AS/RS 701 may be of any type generally known in the art, suitable for handling the replenishment tasks described herein.

When particular products are needed to replenish product dispensers, such as the vertical conveyor dispenser, a case of the product is retrieved by the AS/RS 701 and placed on path 705, which path is a conveyor or any other type of suitable transport mechanism. Path 705 splits into paths 709 and 711. Path 709 takes a full case directly to other areas for processing or to product dispensers of the type described in U.S. Pat. No. 5,064,341, issued Nov. 12, 1991, that are capable of pulling products directly from the case. Otherwise, if the products are to be used for replenishing dispensers such as the vertical conveyor dispenser, the case is taken via path 711 to case pull station 713.

At the case pull station 713, the cases are opened and products are pulled from the cases to form a singulated or end-to-end stream of products on paths 715 and 717. The opening and pulling are accomplished manually or by a machine for singulating such products into an end-to-end stream. The paths 715 and 717 are, in the preferred embodiment, the product conveyors 506 and 507 shown in FIG. 5. Further, paths 715 and 717 from the case pull station 713 are shown only as one example; a single such path is possible, or a large number of paths, depending on the number of rows of product dispensers in the AOS.

When less than a full case is required, or in when the wrong case is retrieved by the AS/RS 701, a return loop 719 returns the broken case or the wrong case to the AS/RS for storage.

This description is not intended to limit the scope of the invention to the particular form set forth and is intended to cover such alternatives, modifications, and equivalents as may be included within the spirit and scope of the invention as defined in the appended claims.

I claim:

1. A reconfigurable vertical conveyor for dispensing products in an automated order dispensing system, comprising:
    a vertical conveyor belt having a plurality of apertures vertically spaced thereon and extending therethrough, said belt having opposed surfaces;
    at least one shelf for supporting products to be dispensed; and
    means for releasably mounting the shelf to the vertical conveyor belt at selected aperture locations for reconfiguration of the vertical conveyor, comprising:
        means for engaging an aperture including a first member engaging one belt surface and a flexible member extending through the aperture and detachably engaging the opposed belt surface; and
        means for connecting the shelf to the means for releasably mounting.

2. The reconfigurable vertical conveyor for dispensing products according to claim 1 further comprising adjacent conveyor belts and means for selectively coupling said adjacent conveyor belts for synchronous operation such that shelves on the adjacent conveyor belts will be horizontally aligned.

3. The reconfigurable vertical conveyor for dispensing products according to claim 1 wherein said means for connecting the shelf includes means for pivotally connecting the shelf to the means for releasably mounting.

4. The reconfigurable vertical conveyor for dispensing products according to claim 3 including a pivot bracket engaging an end of a pivotally connected shelf to orient the shelf with respect to the conveyor belt to form a compartment on a front side of the vertical conveyor for supporting a product.

5. The reconfigurable vertical conveyor for dispensing products according to claim 1 wherein the flexible member extending through an aperture of the vertical conveyor belt includes compressible latch ears for detachably engaging the aperture of said conveyor belt.

6. A reconfigurable product dispenser comprising:
    a first vertical conveyor belt;
    first drive means for imparting motion to said first conveyor belt;
    a second vertical conveyor belt adjacent the first vertical conveyor belt;
    second drive means for imparting motion to said second conveyor belt;
    at least one compartment shelf pivotally mounted to each vertical conveyor belt; and
    means for coupling the first drive means for the first vertical conveyor belt to the second drive means of the second vertical conveyor belt for synchronous operation of said first drive means and said second drive means such that the compartment shelves of said first and second vertical conveyor belts are horizontally aligned for holding a product to be dispensed.

7. An automated order dispensing system, comprising:
    a central conveyor; and
    a vertical conveyor dispenser for dispensing products onto the central conveyor, the vertical conveyor dispenser including:
        a conveyor belt having a plurality of vertically spaced apertures and opposed sides; and
        a plurality of shelves releasably attached at selected aperture locations to the conveyor belt by means of a flexible member extending through the aperture for engaging the opposed sides of the conveyor belt.

8. The automated order dispensing system according to claim 7 further comprising:
    a second vertical conveyor dispenser for dispensing products onto the central conveyor adjacent to the first vertical conveyor, the second vertical conveyor dispenser including a conveyor belt and a plurality of shelves vertically spaced and releasably attached to the conveyor belt; and
    means for synchronously coupling movement of the first vertical conveyor dispenser to the second vertical conveyor dispenser to horizontally align the shelves in adjacent vertical conveyors to handle a single product for dispensing.

9. The automated order dispensing system according to claim 7 wherein the vertical conveyor dispenser further comprises:
    means, connected to the flexible member, for pivotally coupling a shelf to the conveyor belt; and
    means for supporting a pivoting shelf in an orientation with respect to the surface of the conveyor belt to form a compartment for accepting and retaining a product.

10. A reconfigurable vertical conveyor for dispensing products in an automated order dispensing system, comprising:

a vertical conveyor belt having a plurality of apertures arranged in spaced relationship along the belt;

at least one shelf for supporting products to be dispensed;

means for releasably connecting the shelf to the vertical conveyor belt, said means for releasably connecting the shelf including compressible latch ears for engaging the apertures of said conveyor belt; and means for pivotally connecting said shelf to said means for releasably connecting.

11. The reconfigurable vertical conveyor for dispensing products according to claim 10 further including a pivot bracket engaging an end of a pivotally connected shelf to form a compartment for supporting a product on a front side of the vertical conveyor.

12. The reconfigurable vertical conveyor for dispensing products according to claim 10 further comprising:

a second vertical conveyor belt adjacent to the first vertical conveyor belt, each belt having at least one shelf; and means for synchronizing operation of each belt such that shelves on the adjacent conveyor belts will be horizontally aligned to form a compartment for holding a product for dispensing.

13. An automated order dispensing system, comprising:

a central conveyor;

a first vertical conveyor dispenser for dispensing products onto the central conveyor, the vertical conveyor dispenser including a first conveyor belt;

a second vertical conveyor dispenser adjacent to the first vertical conveyor dispenser for dispensing products onto the central conveyor, the second vertical conveyor dispenser including a second conveyor belt;

at least one shelf pivotally mounted to each conveyor belt;

means for orienting each pivotally mounted shelf with respect to the conveyor belt for supporting a product thereon; and means for selectively synchronizing operation of the first and second vertical conveyors such that pairs of shelves on adjacent conveyor belts are horizontally aligned to support a single product.

14. The automated order dispensing system according to claim 13 further comprising:

means for detachably mounting individual shelves to the conveyor belts for reconfiguring the automated order dispensing system to handle products of different sizes.

15. The reconfigurable vertical conveyor for dispensing products according to claim 14 wherein the means for detachably mounting shelves includes a flexible pair of latch ears for engaging an aperture in the conveyor belt.

* * * * *